UNITED STATES PATENT OFFICE.

RAYMOND B. PRICE, OF NEW YORK, N. Y., ASSIGNOR TO RUBBER REGENERATING COMPANY, A CORPORATION OF INDIANA.

PROCESS OF MANUFACTURING RUBBER ARTICLES.

1,211,351.  Specification of Letters Patent.  Patented Jan. 2, 1917.

No Drawing. Application filed February 9, 1915, Serial No. 6,980. Renewed June 6, 1916. Serial No. 102,090.

*To all whom it may concern:*

Be it known that I, RAYMOND B. PRICE, a citizen of the United States, and a resident of New York, county of New York, and State of New York, have invented certain new and useful Improvements in the Process of Manufacturing Rubber Articles, of which the following is a full, clear, and exact description.

This invention relates to the manufacture of rubber articles and has for an object to maintain a predetermined relationship of the materials therein by eliminating the distortion of the materials, more particularly fabric and rubber, from their predetermined relationship, which distortion usually occurs while final formation is being given to the article by vulcanization under compacting pressure.

To illustrate one embodiment of my invention the same will be described in connection with the manufacture of tires.

In the manufacture of tires, a tire is initially built to embody plies of rubber treated fabric and rubber lightly adhering to each other. Final formation is usually given to the tire by vulcanizing the same under compacting pressure. To produce an efficient product, it is essential during the building of the tire that the various materials be assembled with a certain predetermined uniformity of tension and gage, and second, that this uniformity be maintained while vulcanization is being given to the tire.

During vulcanization of tires built in accordance with the present practice, the materials, especially the rubber and fabric of the tire carcass, are distorted and strained from their initial uniform relationship. Distortion occurs because the mobile green rubber of the tire when under heat flows and allows the fabric to escape from place, which condition is enhanced by the pressure of the wrappings, or mold during vulcanization of the tire. As a result of this distortion of the rubber and fabric in the product, the life of the tire is shortened because wherever the plies of fabric are exposed, or are not protected by an adequately intervening layer of rubber, they rub upon each other during flexing of the tire in service with resultant friction and heating whereby the fabric is reduced to powder, thereby producing breaks and punctures.

My invention obviates such distortion of the rubber and fabric from their initial uniform relationship and thereby produces a more efficient tire than hitherto obtainable. To obtain these results the invention resides in converting the green rubber of the rubber treated fabric from which the tire is to be subsequently built, into partially cured rubber having such consistency as to resist displacement and hold the fabric in place while formation is being given to the tire by vulcanization under compacting pressure.

In carrying out the invention, I subject rubber treated tire fabric to a preliminary partial vulcanization which may be effected by steam, open heat, inert or active gas, liquid or other usual or preferred heat medium. Partial vulcanization may also be effected by treating the fabric with sulfur chlorid. This partial vulcanization is performed in the absence of any conditions that would tend to materially distort the rubber and fabric from their predetermined or initial relationship, and as a result the rubber and fabric become set or fixed in their uniform unstrained relationship. After this preliminary partial vulcanization, the tire is built in the usual manner to embody plies of this partially vulcanized rubber treated fabric lightly adhering to each other, and subsequently the tire is given final formation by any usual or preferred vulcanization under compacting pressure, the partially vulcanized rubber now acting as a tenacious cushion which anchors said plies against creeping, and itself has such consistency as to resist displacement.

Tires constructed in the above described manner to embody plies of rubber treated fabric partially vulcanized prior to building and final vulcanization of the tire, will have enhanced strength and movability over tires not so constructed, by virtue of the fabric and rubber of the finished product retaining their initial uniform relationship which is such that each ply of fabric is with certainty separated throughout by an adequate layer of rubber from the next adjacent ply of fabric. Furthermore, such tires may be subjected to higher compacting pressure than ordinarily during vulcanization, since the fabric is protected by the partially cured rubber, which during the preliminary vulcanization takes a certain consistency that resists distortion.

Such tires will be more uniformly compact and homogeneous throughout than ordinarily since that part of the compacting pressure of the pressure cure hitherto expended deleteriously in displacing the plastic green rubber is now advantageously utilized in further compacting the stationary cushion-like partially cured rubber.

What I claim is:

1. The process of manufacturing articles embodying vulcanizable plastic and fabric material, consisting of fixing the relationship of the plastic and fabric by partially vulcanizing the material, building the article of this partially vulcanized material, and giving final formation to the built article by completing the vulcanization of the material.

2. The process of manufacturing articles embodying vulcanizable plastic and fabric material, consisting of fixing the relationship of the plastic and fabric by partially vulcanizing the material in the absence of distorting pressure, building the article of this partially vulcanized material, and giving final formation to the built article by completing the vulcanization of the material under compacting pressure.

3. The process of manufacturing articles embodying vulcanizable plastic and fabric material, consisting of fixing the relationship of the plastic and fabric by partially vulcanizing the material in open heat, building the article of this partially vulcanized material, and giving final formation to the built article by completing the vulcanization of the material under compacting pressure.

4. The process of manufacturing tires embodying rubber treated fabric material, consisting of fixing the relationship of the rubber and fabric by partially vulcanizing said material, building the tire of elements of this partially vulcanized material, and giving final formation to the built tire by completing the vulcanization of the material.

5. The process of manufacturing tires embodying rubber treated fabric material, consisting of first subjecting the material to the action of a setting medium under conditions that will not materially disturb the normal relationship of the rubber and fabric to each other, then building the tire of elements of this material, and finally vulcanizing the built tire.

6. The process of manufacturing tires embodying rubber treated fabric material, consisting of partially vulcanizing the material in the absence of distorting pressure, building the tire of elements of the partially vulcanized material, and finally vulcanizing the built tire under compacting pressure.

Signed at New York, N. Y., this 6th day of February, 1915.

RAYMOND B. PRICE.

Witnesses:
 DANIEL A. WILCOX,
 CHARLOTTE M. SCHULE.